US006989739B2

(12) United States Patent
Li

(10) Patent No.: US 6,989,739 B2
(45) Date of Patent: Jan. 24, 2006

(54) VEHICULAR MONITORING SYSTEMS WITH A MULTI-WINDOW DISPLAY

(76) Inventor: Shih-Hsiung Li, 2F-7, No. 23, Sec. 1, Hangchow S. Rd., Taipei (TW)

( * ) Notice: Subject to any disclaimer, the term of this patent is extended or adjusted under 35 U.S.C. 154(b) by 184 days.

(21) Appl. No.: 10/763,838

(22) Filed: Jan. 22, 2004

(65) Prior Publication Data

US 2005/0162261 A1 Jul. 28, 2005

(51) Int. Cl.
*B60Q 1/00* (2006.01)

(52) U.S. Cl. ...................... 340/438; 340/903; 340/436; 348/47

(58) Field of Classification Search ................ 340/438, 340/436, 435, 937, 901, 426.25, 903; 348/47, 348/118; 180/167, 271
See application file for complete search history.

(56) References Cited

U.S. PATENT DOCUMENTS 5,786,772 A * 7/1998 Schofield et al. ........... 340/903
6,933,837 B2 * 8/2005 Gunderson et al. ......... 340/436
2005/0195383 A1 * 9/2005 Breed et al. ............... 356/4.01

* cited by examiner

*Primary Examiner*—Phung T. Nguyen
(74) *Attorney, Agent, or Firm*—Dellett & Walters

(57) ABSTRACT

A multi-window vehicular monitoring system has a data collection assembly, a console unit and multiple video cameras. The data collection assembly uses RF signal transmission to send distance data, and the console unit is further connected to a monitor and several video cameras. The system employs an image overlay controller to correlate the distance data and images to produce single-channel or multiple-channel video signals. With a continuous display of video images from all angles and constantly updated distance data, the vehicle driver becomes more aware of conditions around the vehicle at any given time. Thus no blind spots exist for the driver around the vehicle. Using such a monitoring system, a driver's visibility and safety can be considerably enhanced under all driving conditions.

12 Claims, 8 Drawing Sheets

VEHICULAR MONITORING SYSTEMS WITH A MULTI-WINDOW DISPLAY

BACKGROUND OF THE INVENTION

1. Field of the Invention

The present invention is related to a vehicular monitoring system with a multi-window display, and more particularly to a multi-window monitoring system that can help vehicle drivers monitor changing conditions in usual blind spots around the vehicle using multiple video cameras and ultrasonic signal transceivers.

2. Description of Related Art

Currently back-up detectors are becoming standard equipment in most passenger vehicles. The back-up detector is used to check the distance between the vehicle and any object behind the vehicle when the vehicle is in the reverse gear. The electronic detector has an array of ultrasonic sensors on the bumper which is connected to the gear box control circuitry and an alarm. When the vehicle is in the reverse gear and an object appears in the preset warning range, the electronic detector will initiate the alarm to warn the vehicle driver. Therefore, this is an effective safety feature for passenger vehicles.

However, nothing is more realistic than seeing video images that actually present the road conditions. Modern drivers have become satisfied with only electronic detectors. They need an all-purpose monitoring device that allows them to see images taken from different angles simultaneously, especially in usual blind spots where the driver's view is blocked by the vehicle body. With such a monitoring device, the driver's visibility is greatly enhanced because the driver is more aware of the changing conditions around the vehicle.

Also, conventional back-up detectors mounted on a vehicle with elevated bumpers cannot detect objects lying below the detection zone, but these objects do pose a real threat. If the vehicle runs over them unwarily, they can cause damage to the bottom of the vehicle.

To correct, the foregoing problem, some manufacturers have incorporated a video camera and a display monitor in the detection systems. The monitor is either installed in the rearview mirror or as a stand-alone display on the dashboard in the driver compartment, such that images from the video cameras at the rear of the vehicle are simultaneously presented at the rearview mirror or stand-alone monitor during normal driving and parking. However, the present design of these detection systems with video display are only suitable for passenger vehicles, and the detection systems have only one video camera.

Large vehicles, The shape and size of vehicle bodies of large vehicles cause large vehicles to have more blind spots than a passenger car. Consequently, using one video camera to cover all possible angles is almost impossible. Furthermore, simultaneously displaying the video from several video cameras presents a significant techical problem. Some of the common problems for different types of detector systems are described below.

1. Hard-wired detector systems: Using several hard-wired detectors and video cameras creates complicated wiring configurations and raises the question of how to control multiple images from several video cameras on a common screen simultaneously.

2. Wireless detector systems: these detectors do away with much of the electrical wiring, but in the case where several video cameras use the same frequency band or nearby vehicles have wireless detectors with similar frequency bands, video degradation will occur due to mutual interference.

The foregoing problems associated with the use of multiple video cameras need to be solved if simultaneous operation is to be achieved.

SUMMARY OF THE INVENTION

The main objective of the present invention is to provide a vehicular monitoring system with a multi-window display that uses a window overlay technique so one monitor can simultaneously display multiple video images. The multiple video images are taken by several video cameras mounted at different positions on a vehicle. Therefore, the vehicle driver is more aware of the conditions around the vehicle and is not subject to blind spots.

To this end, the present invention provides a vehicular monitoring system that is formed by a data collection assembly, a console unit, multiple video cameras and a monitor. The video cameras are installed around the vehicle at locations to cover blind spots.

The data collection assembly essentially comprises an assembly controller, a wireless signal transmitter and multiple ultrasonic signal transceivers. The assembly controller receives signals from the ultrasonic signal transceivers, processes the signals and sends the processed signals to the console unit.

The console unit is connected to the multiple video cameras to receive video images from different angles around the vehicle. The signals from the ultrasonic signal transceivers and the video cameras are digitized, compressed and output as either single-channel or multiple-channel video signals to the monitor for simultaneous display by using a window display technique.

By using this synchronous control of the multiple video cameras and the ultrasonic signal transceivers, the present invention increases the driver's visibility, obviating usual blind spots around the vehicle and enhances driving and parking safety with accurate measurement of distances to objects.

Other objectives, advantages and novel features of the invention will become more apparent from the following detailed description when taken in conjunction with the accompanying drawings.

DETAILED DESCRIPTION OF THE PREFERRED EMBODIMENT

Figure 1A:
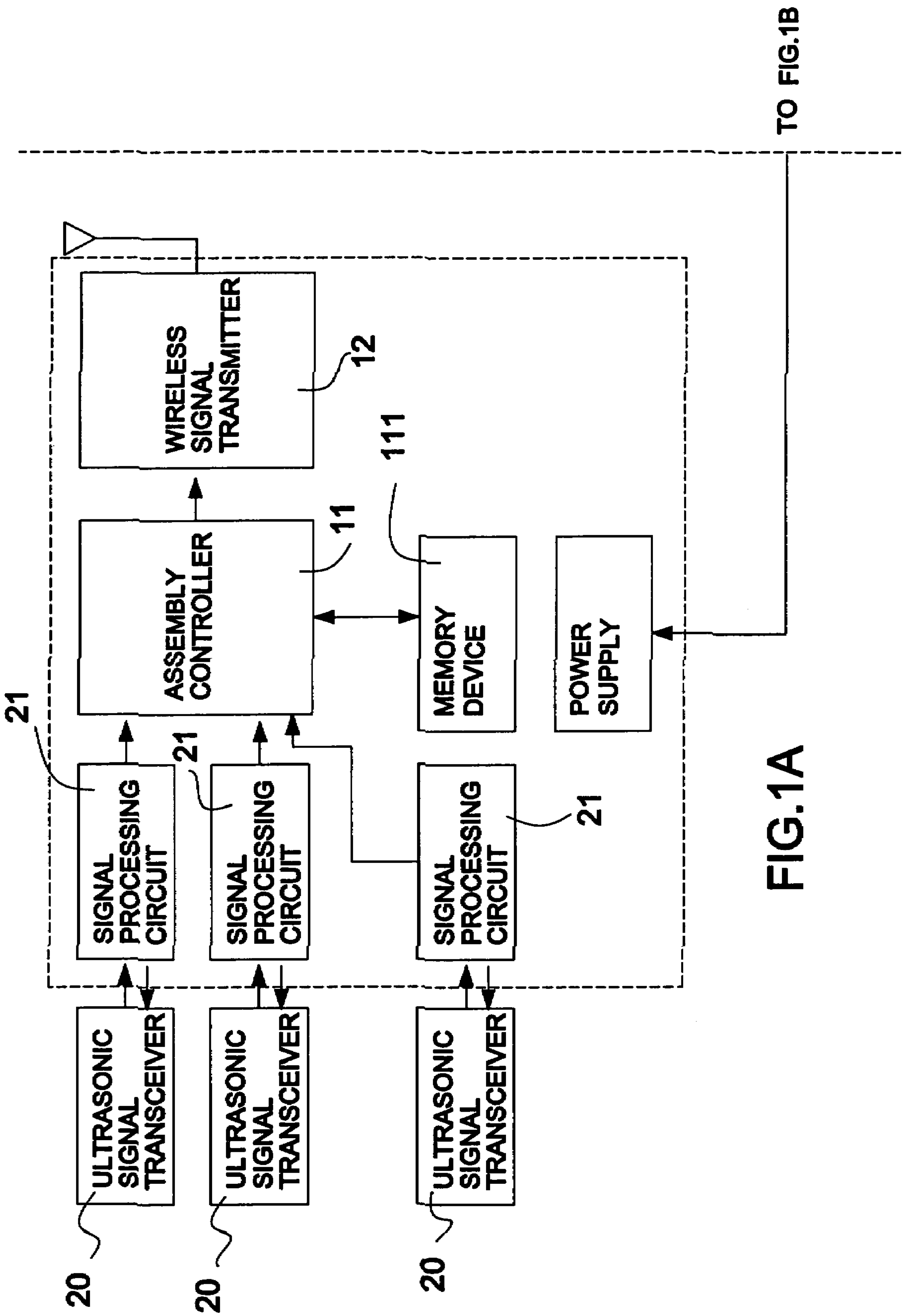
FIG. 1A and FIG. 1B comprise a functional block diagram of a vehicular monitoring system with a multi-window display in accordance with the present invention.
Figure 1B:
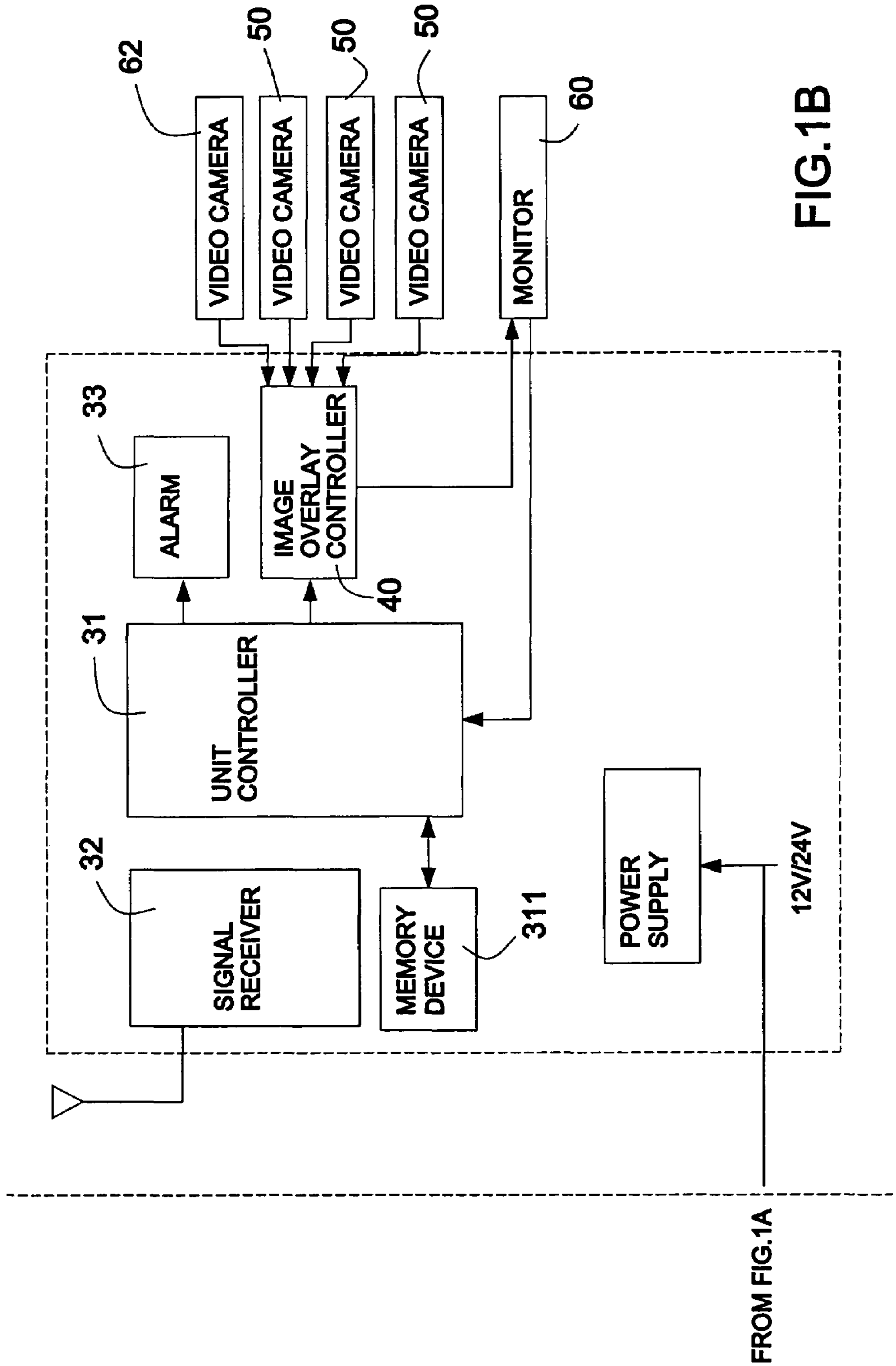

With reference to FIG. 1, the present invention provides a multi-window monitoring system installable on large vehicles. The system has more than one video camera (50) and multiple ultrasonic signal transceivers (20) installed at different locations on the large vehicle. The video cameras (50) can be installed at locations to cover usual blind spots when the vehicle makes a turn or is in reverse gear. The ultrasonic signal transceivers (20) can be installed on sides of the vehicle and on the vehicle bumpers to determine the distance to any object that the vehicle is approaching. An alarm (33) is initiated to warn the vehicle driver when the vehicle approaches an object within a preset threshold range.

The multi-window monitoring system comprises a data collection assembly (10), a console unit (30), multiple video cameras (50) and a monitor (60).

Figure 2:
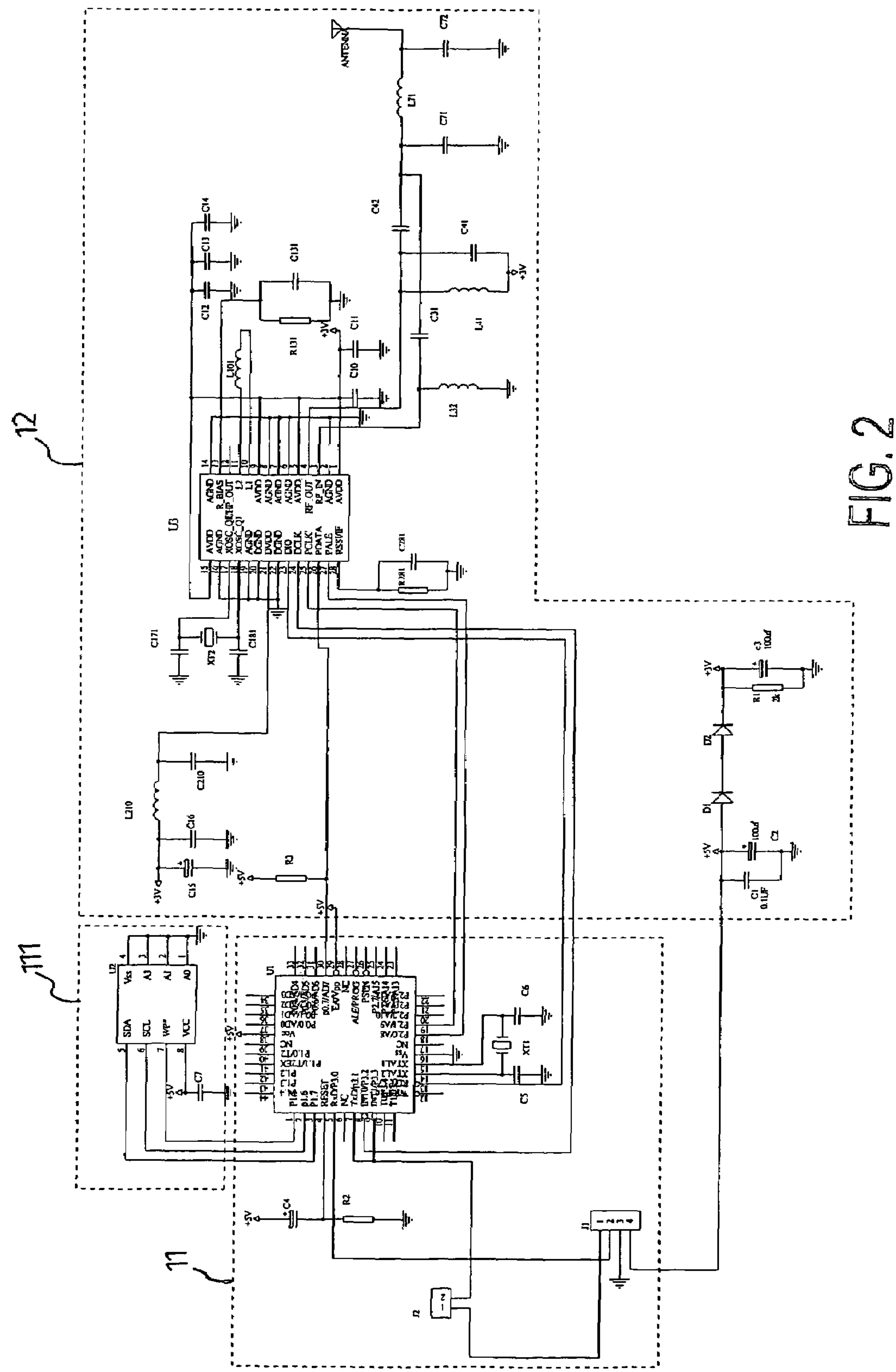
FIG. 2 is a circuit diagram of part of a data collection assembly in FIG. 1.
Figure 3:
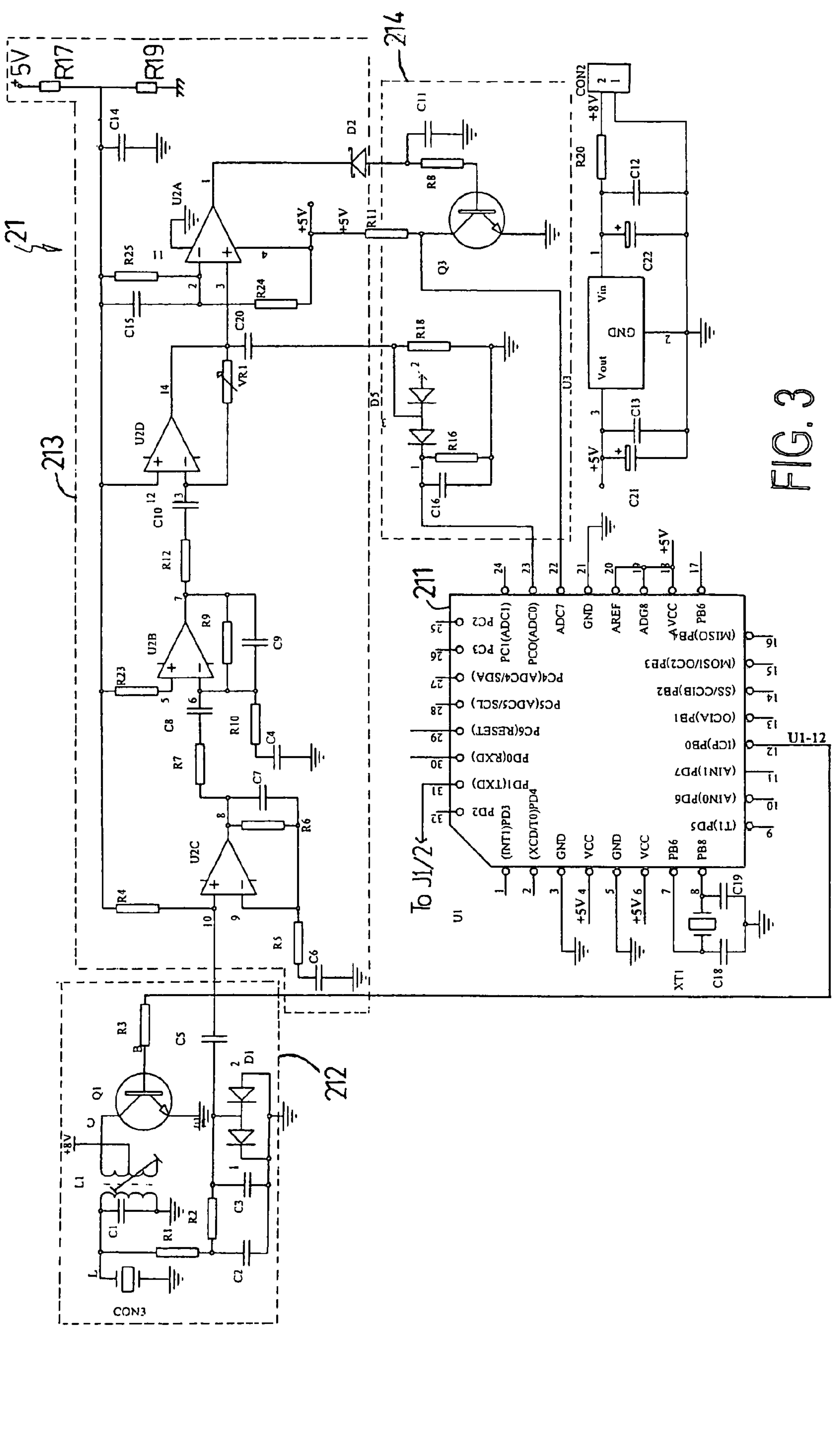
FIG. 3 is a circuit diagram of a signal processing circuit in the data collection assembly in FIG. 1;.

With further reference to FIGS. 2 and 3, the data collection assembly (10) comprises an assembly controller (11), a memory device (111), multiple signal processing circuits (21), multiple ultrasonic signal transceivers (20), a wireless signal transmitter (12) and a power supply unit (not numbered).

The assembly controller (11) has multiple inputs and outputs and receives, converts and formats data for further transmission.

The memory device is connected to (111) and stores all ultrasonic signal transceiver identification codes.

The multiple signal processing circuits (21) are connected to inputs of the assembly controller (11) and respectively comprise a microprocessor (211), an ultrasonic signal transceiving circuit (212), a signal amplifier (213) and a signal converter (214).

The microprocessor (211) is connected to the assembly controller (11) to feed digitized signals to the assembly controller (11)

The multiple ultrasonic signal transceivers (20) are connected respectively to the signal processing circuits (21), transmit ultrasonic signals, receive ultrasonic echoes and send the ultrasonic echoes to the assembly controller (11).

The wireless signal transmitter (12) is an RF signal transmission module, is connected to the output of the assembly controller (11), receives data processed by the assembly controller (11) and transmits the processed data as an RF signal. The wireless signal transmitter (12) uses an antijamming technique to avoid mutual interference. The antijamming technique may be frequency hopping, spread spectrum technique or the like.

Figure 4:
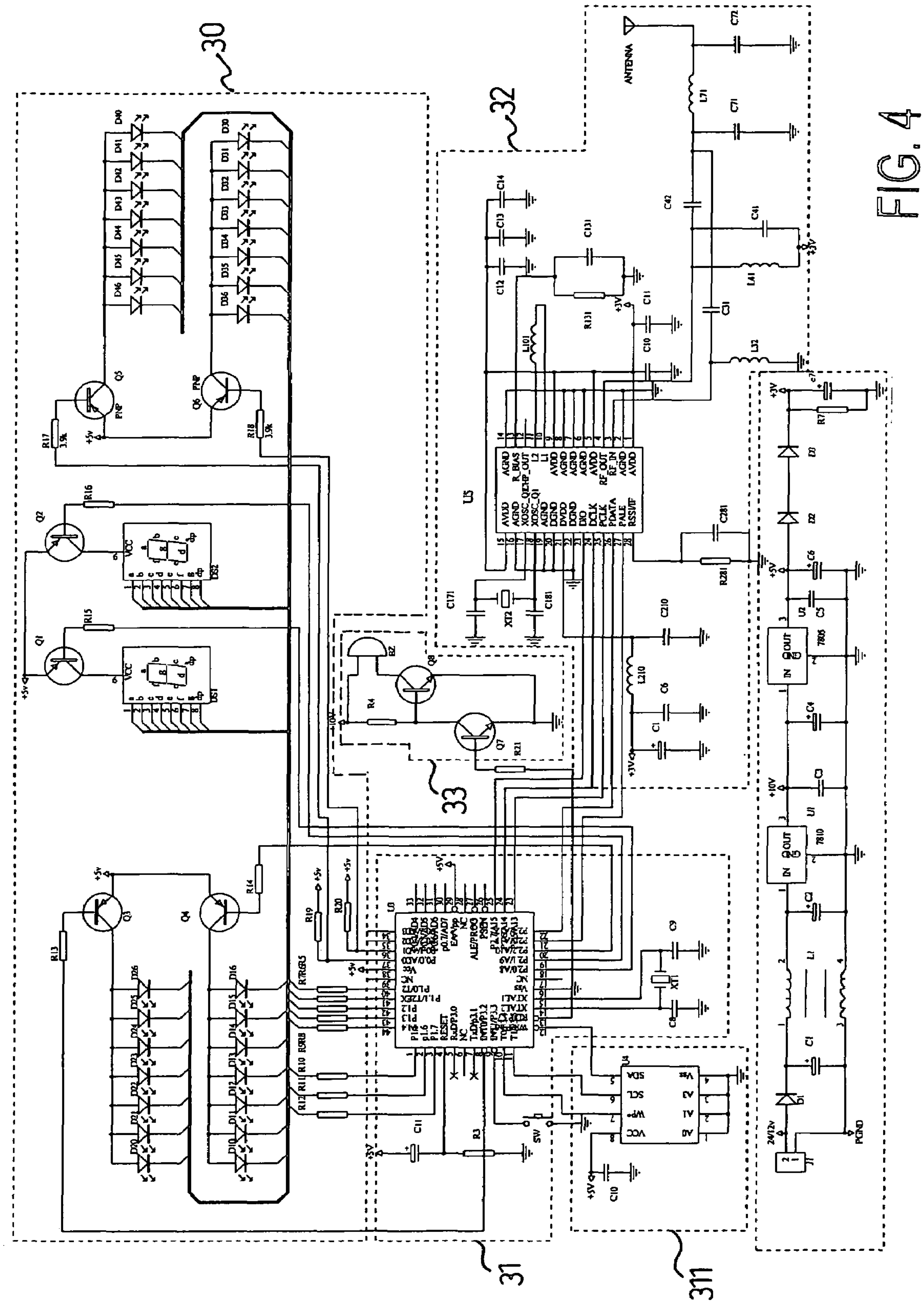
FIG. 4 is a circuit diagram of part of a console unit in FIG. 1.

With reference to FIGS. 1 and 4, the console unit (30) comprises a unit controller (31), a signal receiver (32), an alarm (33), an image overlay controller (40) and a power supply unit (not numbered), has multiple inputs (not numbered) and outputs (not numbered), receives and processes data from the assembly controller (11) to determine when distance thresholds have been exceeded, formats video data from multiple sources for simultaneous presentation and initiates and presents warnings when distance thresholds have been exceeded.

The signal receiver (32) is an RF signal transmission module, is connected to an input of the unit controller (31) and receives RF signals from the wireless signal transmitter (12).

The alarm (33) is connected to an output of the unit controller (31) and sounds an audible warning, a visual warning or both when initiated by the unit controller.

The unit controller (31) receives signals from the data collection assembly (10), verifies the signal sources, analyzes the data to determine whether to enable the console operations when a preset condition is fulfilled, activates presentation of video data and initiates warnings.

The memory device (311) stores identification codes of all ultrasonic signal transceivers (20) and preset conditions and thresholds.

Figure 5:
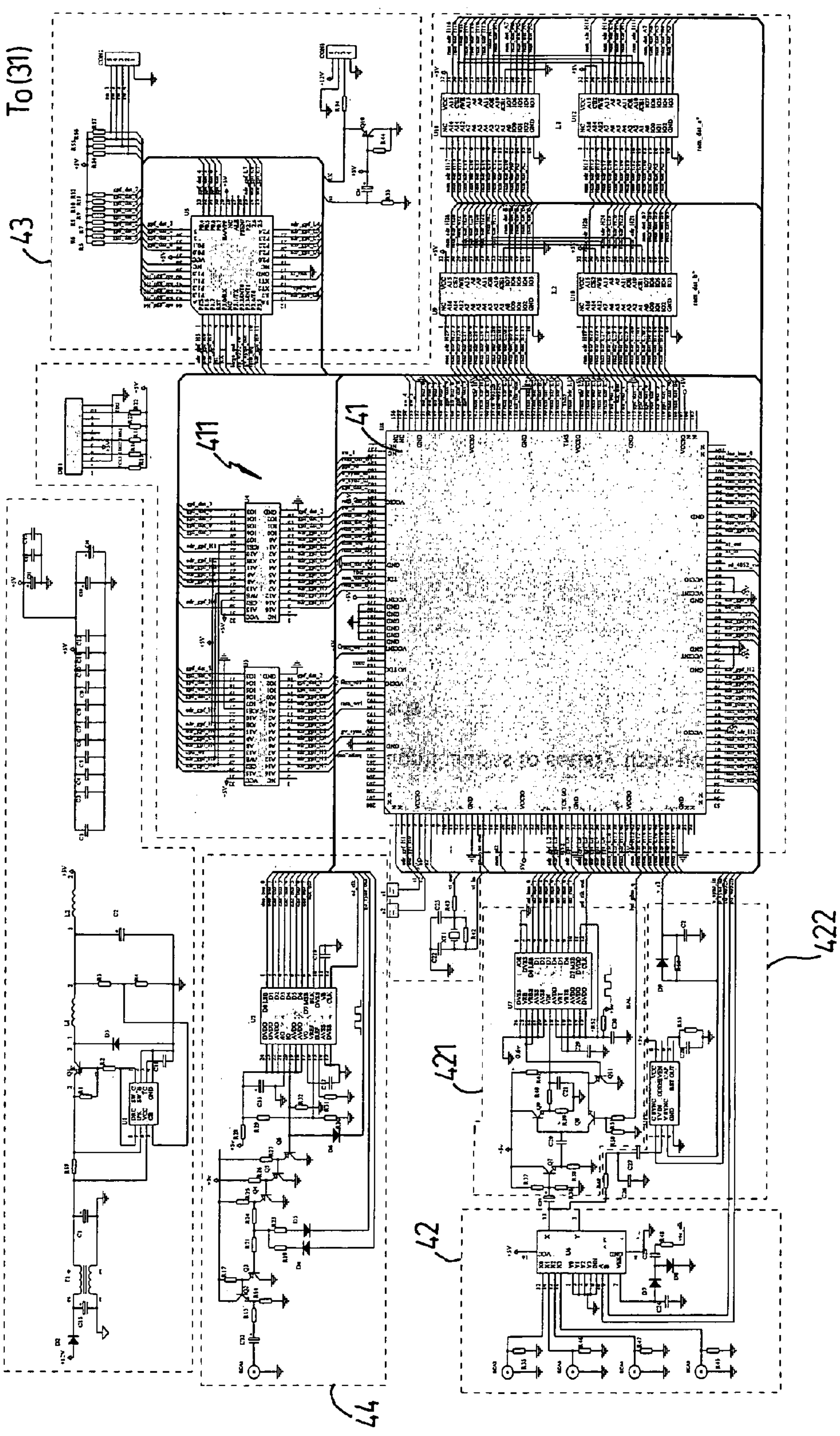
FIG. 5 is a circuit diagram of an image overlay controller in FIG. 1.

With further reference to FIG. 5, the image overlay controller (40) has multiple video input terminals (not numbered), a data input terminal (not numbered) and a video output terminal (not numbered) and conprises a programmable video controller (41), a multiplexer (42), an A/D signal converter (421), a horizontal-sync signal separation circuit (422) a buffer (43) and a D/A converter (44). The data input is connected to an output of the unit controller (31).

The programmable video controller (41) includes a temporary memory (411) and has multiple inputs (not numbered) and multiple outputs (not numbered).

The multiplexer (42) has multiple video inputs (not numbered) and multiple outputs (not numbered).

The A/D signal converter (421) is connected to an output of the multiplexer (42) and inputs of the programmable video controller (41) that sends video data to the temporary memory (411).

The horizontal-sync signal separation circuit (422) is connected to an output of the multiplexer (42) and inputs to the programmable video controller (41).

The buffer (43) is connected to an input of the programmable video controller (41) and to an output of the unit controller (31) that sends a copy of the distance data from the data collection assembly (10).

The D/A converter (44) is connected to an output of the programmable video controller (41), which converts the superimposed images to produce single-channel or multiple-channel video signals.

The programmable video controller (41) through the multiplexer (42) controls the switching of the display window either sequentially or randomly.

The programmable video controller (41) works in conjunction with the horizontal-sync signal separation circuit (422) to separate out the horizontal-sync signals and the A/D signal converter (421) to convert video signals to digitized images, and then the converted data are written into the temporary memory (411) using a predetermined clock.

Figure 6:
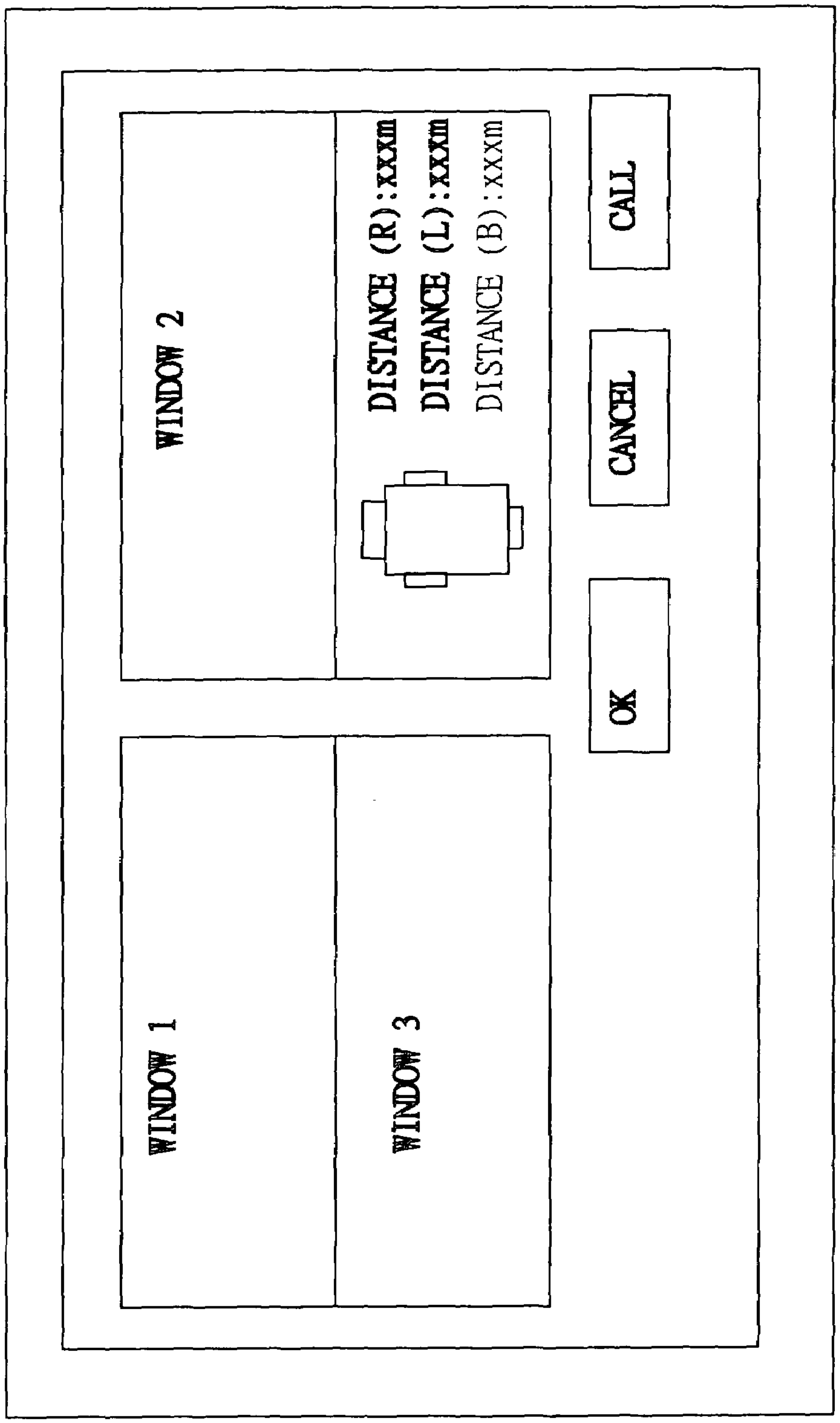
FIG. 6 is a standard display format on a multi-window display.

Another function of the programmable video controller (41) is to correlate the distance data and the video images, such that the distance data can be superimposed over corresponding images. Then, the superimposed images are compressed and converted to produce one-channel or multiple-channel video signals through the signal converter (44). Thereafter, the converted With further reference to FIG. 6, the monitor (60) has a video and control input (not numbered), a control output (not numbered), a touch-screen with multiple function keys. Video signals from the signal converter (44) are presented on the monitor (60) as images in several windows simultaneously, and the distance data are superimposed over video images.

Figure 7:
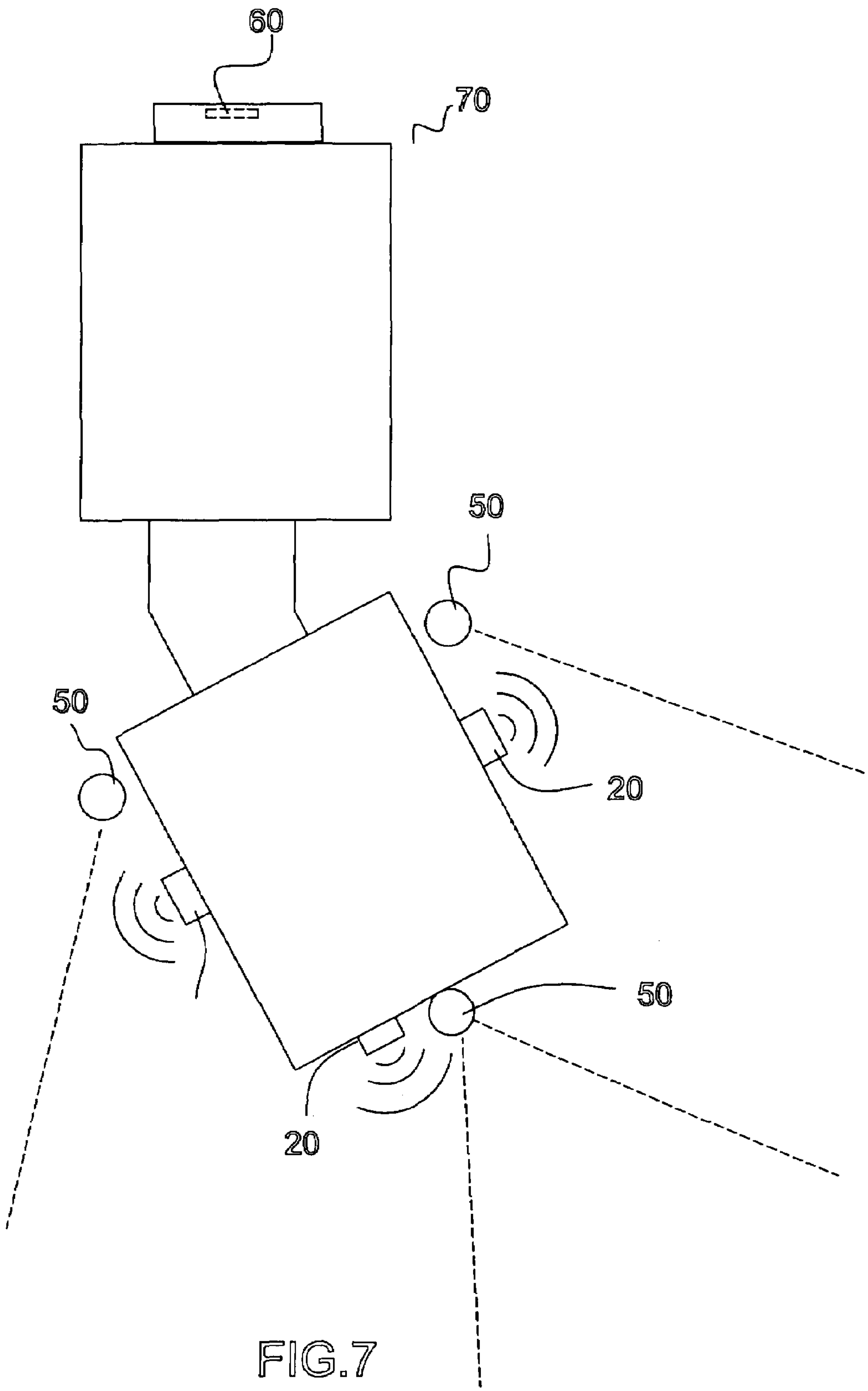
FIG. 7 is a diagram of the suitable positions around a large vehicle for installation of ultrasonic signal transceivers and video cameras.

With reference to FIG. 7, tractor trailers (70) usually have a long and bulky trailer. When the tractor trailer makes a turn, the trailer (71) causes many blind spots. However, multiple video cameras (50) and ultrasonic signal transceivers (20) installed on the edges of the trailer (71) make the vehicle driver more aware of the conditions around the vehicle by displaying video images and distance data continuously on the monitor.

A preferred embodiment of the vehicular monitoring system with a multi-window display uses three video cameras (50) and three ultrasonic signal transceivers (20) corresponding respectively to the video cameras (50). These video cameras (50) and ultrasonic signal transceivers (20) are installed at different locations around the sides and back of the trailer (71), and the monitor (60) is set up with multiple windows to simultaneous display of images from the video cameras (20) shooting at different angles. The distance data are obtained from the ultrasonic signal transceivers (20) and superimposed on the video images. The distance data are continuously updated as the vehicle gets closer to an object.

The monitor (60) has a touch screen with built-in function keys, and the monitoring system provides several display modes for displaying images and distance data. The vehicle driver can choose to present the images from a particular video camera using full screen display, or simultaneous display of all windows. Since the monitor (60) is connected to the unit controller (60), the unit controller (31) notifies the programmable video controller (41) and orders the multiplexer (42) to switch to the chosen display mode as soon as the vehicle driver makes a selection on the touch screen.

When the vehicle body gets within a preset threshold range of an object, the unit controller (31) will cause the alarm (33) to emit a beeping sound that increases in frequency as the vehicle approaches the object. As long as the object detected by the ultrasonic signal transceivers (20), the unit controller (31) continuously feeds the distance data through the image overlay controller (40) to the monitor screen to keep the vehicle driver informed of the current distance between the vehicle body and the object.

The multi-window monitoring system is able to cover all blind spots around the vehicle. Therefore, the system is suitable for large vehicles and keeps the vehicle driver more aware of the changing road conditions. Therefore, the driver's visibility and driving safety can be considerably enhanced.

Another advantage of the present invention is that the multi-window monitoring system is operated by wireless signal transmission. Therefore the system installation can be easily accomplished without a large amount of wiring and connections.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A multi-window monitoring system, comprising:

a data collection assembly (10) having
- an assembly controller (11);
- a memory device (111) connected to the assembly controller (11);
- multiple ultrasonic signal transceivers (20);
- multiple signal processing circuits (21) connected to the assembly controller (11) and respectively to the ultrasonic signal transceivers (20); and
- a wireless signal transmitter (12) connected to the assembly controller (11);

a console unit (30) having
- a unit controller (31);
- a signal receiver (32);
- an alarm (33); and
- an image overlay controller (40) that has multiple video input terminals, a data input terminal connected to the unit controller (31) and an video output terminal;

multiple video cameras (50) connected respectively to the video input terminals of the image overlay controller (40); and a monitor (60) connected to the video output terminal of the image overlay controller (40) and having a touchscreen with multiple function keys.

2. The multi-window monitoring system according to claim 1, wherein the image overlay controller (40) comprises:

a programmable video controller (41) being connected to a temporary memory(411);

a multiplexer (42), which is connected to the programmable video controller (41) and the temporary memory (411) through an A/D signal converter (421) and a horizontal-sync signal separation circuit (422);

a buffer (43) connected to an input terminal of the programmable video controller (41); and a D/A converter (44), which is connected between the programmable video controller (41) and the monitor (60) to convert images to single-channel or multiple-channel video images and pass the converted images to the monitor (60) for display.

3. The multi-window monitoring system according to claim 2, wherein the unit controller (31) is connected to a memory device (311) for saving identification codes of all ultrasonic signal transceivers (20), wherein the signal receiver (32) is a RF signal transmission module.

4. The multi-window monitoring system according to claim 3, wherein the monitor (60) is a touch screen type monitor.

5. The multi-window monitoring system according to claim 1, wherein the assembly controller (11) of the console assembly (10) connects to a memory device (111) that saves identification codes of all ultrasonic signal transceivers (20);

each ultrasonic module (20) is connected to the assembly controller (11) through a signal processing circuit (21), so that ultrasonic signals returned from the ultrasonic signal transceivers (20) are digitized and passed to the assembly controller (11); and the wireless signal transmitter is a RF signal transmission module that utilizes a frequency hopping techniue or a frequency spreading technique to avoid mutual interference.

6. The multi-window monitoring system according to claim 5, wherein the signal processing circuit (21) comprises a microprocessor (211), an ultrasonic signal transceiving circuit (212), a signal amplifier (213) and a signal converting circuit (214), where the microprocessor (211) is connected to the assembly controller (11) for passing on digitized signals.

7. The multi-window monitoring system according to claim 6, wherein the unit controller (31) is connected to a memory device (311) for saving identification codes of all ultrasonic signal transceivers (20), wherein the signal receiver (32) is a RF signal transmission module.

8. The multi-window monitoring system according to claim 7, wherein the monitor (60) is a touch screen type monitor.

9. The multi-window monitoring system according to claim 5, wherein the unit controller (31) is connected to a memory device (311) for saving identification codes of all ultrasonic signal transceivers (20), wherein the signal receiver (32) is a RF signal transmission module.

10. The multi-window monitoring system according to claim 9, wherein the monitor (60) is a touch screen type monitor.

11. The multi-window monitoring system according to claim 1, wherein the unit controller (31) is connected to a memory device (311) for saving identification codes of all ultrasonic signal transceivers (20), wherein the signal receiver (32) is a RF signal transmission module.

12. The multi-window monitoring system according to claim 11, wherein the monitor (60) is a touch screen type monitor.

* * * * *